US009363641B2

(12) United States Patent
Yang et al.

(10) Patent No.: US 9,363,641 B2
(45) Date of Patent: Jun. 7, 2016

(54) SERVICE METHOD AND SYSTEM FOR PROVIDING REWARD USING MOVING PATH OF USER

(71) Applicant: NHN Entertainment Corporation, Seongnam-si (KR)

(72) Inventors: Jeong-Kwon Yang, Seongnam-si (KR); Chung-Hyun Yu, Seongnam-si (KR); Dae Woo Cho, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 0 days.

(21) Appl. No.: 14/487,441

(22) Filed: Sep. 16, 2014

(65) Prior Publication Data

US 2015/0080023 A1 Mar. 19, 2015

(30) Foreign Application Priority Data

Sep. 16, 2013 (KR) .......................... 10-2013-0111241

(51) Int. Cl.
*H04W 4/02* (2009.01)
(52) U.S. Cl.
CPC ............... *H04W 4/025* (2013.01); *H04W 4/021* (2013.01); *H04W 4/028* (2013.01)
(58) Field of Classification Search
CPC .................................................... H04W 4/025
See application file for complete search history.

(56) References Cited

U.S. PATENT DOCUMENTS

2013/0054647 A1* 2/2013 Terauchi ........................ 707/780
2014/0274154 A1* 9/2014 Rana et al. ................. 455/456.3

FOREIGN PATENT DOCUMENTS

| KR | 10-2011-0017078 | 2/2011 |
| KR | 10-2011-0042624 | 4/2011 |
| KR | 10-1048418 | 7/2011 |
| KR | 10-2011-0139355 | 12/2011 |

OTHER PUBLICATIONS

Sandholm et al., "Real-time, Location-aware Collaborative Filtering of Web Content", Feb. 13, 2011, p. 1-5, Sandholm et al., Stanford, CA.

* cited by examiner

*Primary Examiner* — Leon Flores
(74) *Attorney, Agent, or Firm* — H.C. Park & Associates, PLC

(57) ABSTRACT

Disclosed are a system and a service method for providing a digital content based on a moving path of a user. A service method may include storing and managing data in which coordinates of a map are converted to Geo-Hash coordinates according to a Geo-Hash algorithm, receiving location information from a terminal of a user, converting the location information to the Geo-Hash coordinates, and providing, to the terminal, information about digital content allocated to a Geo-Hash area including adjacent Geo-Hash coordinates based on the Geo-Hash coordinates. The terminal may be configured to determine the digital content to be provided to the terminal based on information about the digital content allocated to the Geo-Hash area and new location information of the terminal.

17 Claims, 18 Drawing Sheets

SERVICE METHOD AND SYSTEM FOR PROVIDING REWARD USING MOVING PATH OF USER

CROSS-REFERENCE TO RELATED APPLICATION

This application claims priority from and the benefit under 35 U.S.C. §119(a) of Korean Patent Application No. 10-2013-0111241, filed on Sep. 16, 2013 the entire disclosure of which is incorporated by reference for all purposes.

BACKGROUND

1. Field

The following description relates to a service method and a system for providing a reward based on a movement or an activity of a user.

2. Discussion of the Background

A location based service refers to a service system that may provide a variety of services to a user based on location information acquired through a mobile communication network or a global positioning system (GPS).

Location based services according to the related art may provide a simple navigation service for climbing or cycling, provide information about an amount of exercise recorded, or provide a record about a moving path of a user. The location based services have constraints in providing a service using only a current location of a user and accordingly, information about many activities of the user may not be utilized.

SUMMARY

Example embodiments provide a service method and system that may maintain and stimulate an activity of a user by measuring and recording an activity of the user that may include a moving path, an exercise amount, and/or a location of the user, by determining a ranking of the user based on the activity of the user, and by issuing digital content as a reward for the activity of the user.

Additional features of the invention will be set forth in the description which follows, and in part will be apparent from the description, or may be learned by practice of the invention.

Exemplary embodiments provide a service method implemented using a computer, the method including storing, in a memory of the computer, map coordinate data, the map coordinate data comprising coordinates of a are converted to Geo-Hash coordinates according to a Geo-Hash algorithm, receiving, using a receiver of the computer, location information of a terminal from the terminal, converting, using a processor of the computer, the location information according to the Geo-Hash coordinates, and transmitting, to the terminal using a transmitter of the computer, information about digital content allocated to a Geo-Hash area comprising adjacent Geo-Hash coordinates based on the converted location information, wherein the terminal is configured to determine the digital content to be transmitted to the terminal based on information about the digital content allocated to the Geo-Hash area and movement information of the terminal with respect to the Geo-Hash area.

Exemplary embodiments provide service method implemented using a computer, the method including storing, in a memory of the computer, data about predetermined paths and digital contents allocated to the predetermined paths, converting, using a processor of the computer, each of the predetermined paths to Geo-Hash coordinates according to a Geo-Hash algorithm, and storing the converted Geo-Hash coordinates in a path database, receiving, from a terminal, location information of the terminal, and measuring an exercise path based on the received location information, converting the exercise path to Geo-Hash coordinates, determining whether the exercise path corresponds to one of the predetermined paths included in the path database, and transmitting, to the terminal, digital content corresponding to the predetermined path when the exercise path and the predetermined path match by at least a predetermined numerical value.

Exemplary embodiments provide a service system, including at least one storage unit, and at least one processor in which the at least one processor may be configured to process a process of storing map coordinate data, the map coordinate data comprising coordinates of a map converted to Geo-Hash coordinates according to a Geo-Hash algorithm, a process of receiving location information from a terminal, a process of converting the location information according to the Geo-Hash coordinates, and a process of transmitting, to the terminal, information about digital content allocated to a Geo-Hash area comprising adjacent Geo-Hash coordinates based on the converted location information, wherein the at least one processor is configured to determine the digital content to be transmitted to the terminal based on information about the digital content allocated to the Geo-Hash area and movement information of the terminal with respect to the Geo-Hash area.

Exemplary embodiments provide a service system, including at least one storage unit, and at least one processor in which the at least one processor may be configured to process a process of storing data about predetermined paths and digital content allocated to the predetermined paths, a process of converting each of the predetermined paths to Geo-Hash coordinates according to a Geo-Hash algorithm, and storing the converted Geo-Hash coordinates in a path database, a process of receiving, from a terminal, location information of the terminal, and measuring an exercise path based on the received location information, a process of converting the exercise path to Geo-Hash coordinates, a process of determining whether the exercise path corresponds to one of the predetermined paths included in the path database, and a process of transmitting, to the terminal, digital content corresponding to the predetermined path when the exercise path and the predetermined path match by at least a predetermined numerical value.

Exemplary embodiments provide a file distribution system for distributing a file to install an application in a terminal, the file distribution system including a file storage configured to store the file, and a file transmitter configured to transmit, to the terminal, the file in response to a request received from the terminal. The application may include a module configured to control the terminal to transmit location information of the terminal to a service server, a module configured to control the terminal to receive, from the service server, information about digital content allocated to a Geo-Hash area comprising adjacent Geo-Hash coordinates based on Geo-Hash coordinates corresponding to the location information, a module configured to control the terminal to issue a digital content based on information about the digital content allocated to the Geo-Hash area and movement information of the terminal with respect to the Geo-Hash area, and a module configured to control the terminal to transmit information about the issued digital content to the service server. The service server may be configured to store map coordinate data, the map coordinate data comprising coordinates of a map converted to Geo-Hash coordinates according to a Geo-Hash algorithm, and to determine the digital content allocated to the Geo-Hash area.

Exemplary embodiments provide a file distribution system for distributing a file to install an application in a terminal, the file distribution system including a file storage configured to store the file, and a file transmitter configured to transmit the file to the terminal in response to a request received from the terminal. The application may include a module configured to control the terminal to transmit location information of the terminal to a service server, and a module configured to control the terminal to receive information about digital content corresponding to a predetermined path from the service server when an exercise path based on the location information of the terminal is determined to correspond to the predetermined path. The service server may be configured to store data about predetermined paths and digital contents allocated to the predetermined paths, to convert each of the predetermined paths to Geo-Hash coordinates according to a Geo-Hash algorithm, to store the converted Geo-Hash coordinates in a path database, to convert the exercise path to Geo-Hash coordinates, to determine whether the exercise path corresponds to one of the predetermined paths included in the path database, and to transmit, to the terminal, digital content corresponding to the predetermined path when the exercise path and the predetermined path match by at least a predetermined numerical value.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
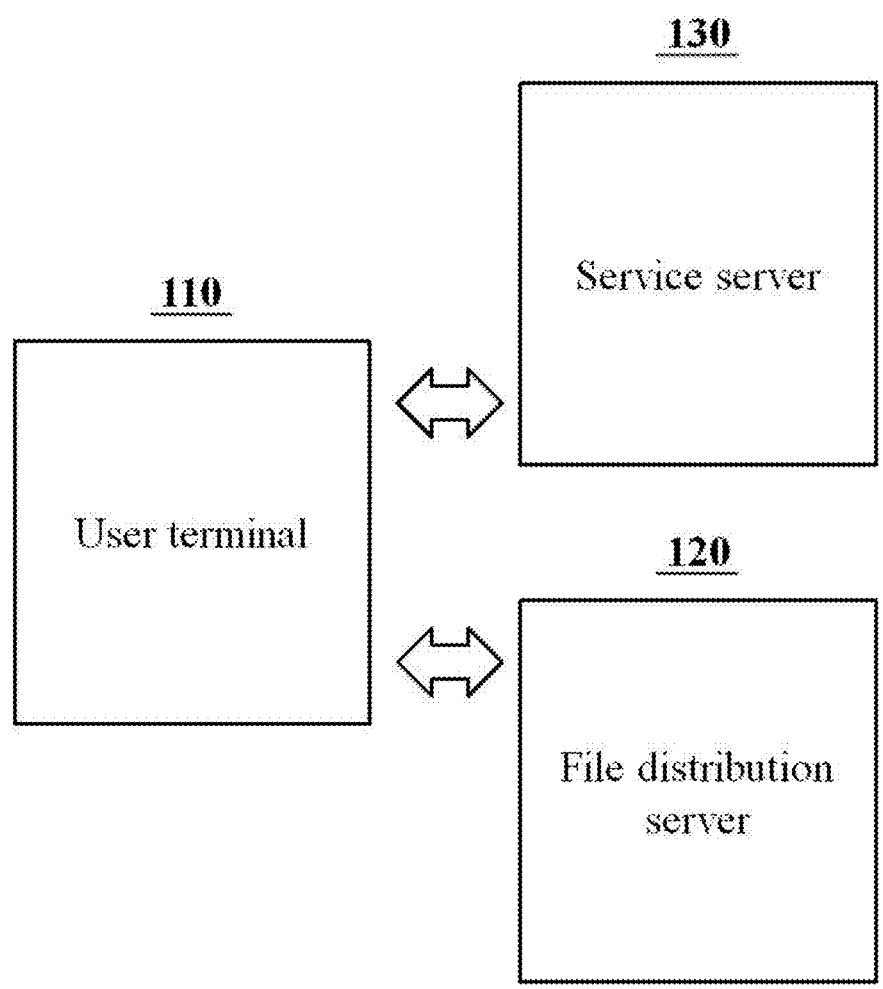
FIG. 1 illustrates a service providing environment according to exemplary embodiments of the present invention.

Exemplary embodiments of the present invention will be described in more detail with reference to the accompanying drawings. These exemplary embodiments will be described in detail for those skilled in the art in order to practice the present invention. It should be appreciated that various exemplary embodiments of the present invention are different but do not have to be exclusive. For example, specific shapes, configurations, and characteristics described in an exemplary embodiment of the present invention may be implemented in another exemplary embodiment without departing from the spirit and the scope of the present invention. In addition, it should be understood that position and arrangement of individual components in each disclosed exemplary embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawings. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing exemplary embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements and/or components, but do not preclude the presence or addition of one or more other features, integers, steps, operations, elements, components, and/or groups thereof.

It will be understood that when an element is referred to as being "connected to" another element, it can be directly connected to the other element, or intervening elements may be present.

Hereinafter, exemplary embodiments of the present invention are described in more detail with reference to the accompanying drawings.

FIG. 1 illustrates an example of a service providing environment according to example embodiments of the present invention. A service providing environment includes a user terminal 110, a file distribution server 120, and a service server 130.

The user terminal 110 may include a mobile terminal of a user, for example, a smartphone, a personal digital assistant (PDA), a tablet computer, a smart watch, an electronic glass (e.g., Google Glass™), and the like. An application for providing a service may be installed in the user terminal 110. For example, the user terminal 110 may use a service provided from the service server 130 through communication with the service server 130 according to a control of the application.

The file distribution server 120 may include a server configured to distribute a file to one or more user terminals for installing an application thereon. For example, the file distribution server 120 may store and manage the file, and may provide the stored file to the user terminal 110 in response to a request of the user terminal 110. In an example, the user terminal 110 may install the application using the file provided from the file distribution server 120, and may be provided with the service using the installed application. The file distribution server 120 may be a server included in the service server 130, or may be a server associated with the service server 130 as a server of a third party.

The service server 130 may, without limitation, refer to a server for providing a service. The service server 130 may provide the service by transmitting and receiving data to and from the user terminal 110 in which the application may be installed. The service may include a service for recording daily life of the user, supporting activities of the user, and providing a digital space in which users may sympathize with mutual activities.

According to exemplary embodiments, the service server 130 may measure and record an activity of the user based on information received from the user terminal 110. In an example, the activity of the user may be measured based on a moving path of the user terminal 110 and amount of exercise or detected movement of the user. The moving path of the user terminal 110 may be intermittently or continuously measured and recorded based on location information of the user terminal 110. For example, the application installed in the user terminal 110 may control the user terminal 110 to transmit global positioning system (GPS) information to the service server 130 based on a predetermined condition, e.g., when a service application for recognizing the location of the user terminal 110 is executed. The service server 130 may measure and record the moving path of the user based on the GPS information received from the user terminal 110. Further, the moving path of the user may be determined in the user terminal 110. Also, the exercise amount may be measured and recorded based on, for example, at least one of calories, a moving distance, a moving time, a moving speed, a moving pace, and an altitude. Activities of the user may be classified into daily life and exercise. Further, a mini game and the like may be selectively added as an activity that may be selected to be performed by the user.

An exercise activity may indicate, for example, an activity of a user to measure at least one of a location of the user, a moving path of the user, and an exercise amount of the user based on a predetermined type of exercise selected by the user, for example, stepping, walking, running, cycling, and climbing. For an exercise activity, a variety of information, such as calories, a moving distance, a moving time, a moving speed, and an altitude, may be measured and recorded based on location information, such as, GPS information received from the user terminal 110 and/or other sensed information sensed by one or more sensors including an accelerometer, a proximity sensor, a gyroscope, a moisture sensor, and the like.

A daily life activity may indicate, for example, an activity of a user to measure a daily exercise amount of the user. The daily exercise amount of the user may be measured, using, for example, a gravity sensor and/or an acceleration sensor. The location information of the user terminal 110 may not be used, or may be selectively used.

The service server 130 may determine rankings of users based on activities of the users. The service server 130 may encourage a user to maintain and/or stimulate an activity of a user by issuing and providing digital content to the user as a reward for the activity. For example, during an activity of the user, digital content may be provided to the user based on an activity record of the user, such as reaching a predetermined location, moving along a predetermined moving path, or achieving a predetermined exercise amount (e.g., 5,000 steps or walking 3 miles). The user terminal 110 may communicate with an exercise machine, such as a treadmill, to receive exercise data. Further, the digital content may be provided to the user terminal 110 or the user by being transmitted to the user terminal 110 and/or being displayed on a screen or display of the user terminal 110 so that the user may view the digital content. Also, when the activity of the user ends, digital content may be further provided based on the activity amount of the user. The digital content may be provided in a form of, for example, a badge, a digital coupon, and points. The digital content may be saved in a personal profile area and may be converted to digital currency and used at a store. Although digital contents were described in terms of rewards, aspects of the invention are not limited thereto, such that penalties may also be issued to encourage users to perform activities.

In addition, the service server 130 may provide a service that enables multiple users to share records, or a service that enables users doing similar activities to be connected to each other. For example, rankings may be assigned amongst users based on an exercise amount, an activity amount, or points. A user may challenge a record achieved by another user that ranks higher than the user.

In addition thereto, the service server 130 may manage a challenge created by a predetermined user or an affiliated company. The challenge may include an exercise event, for example, a marathon, a cycling game, or other events that may elicit participation of multiple users. For example, the affiliated company may create a challenge by holding a marathon game. Users may participate in the challenge by using digital content or digital currency as an entry fee, and may acquire an additional reward, for example, digital content or digital currency wagered by other users and/or provided by the service provider based on the result of the challenge.

As described above, digital content, such as a badge or a coupon may be provided to the user based on at least one of an exercise amount of the user, GPS information, and a moving path. Digital content, such as points in a virtual game, may be provided to the user based on an activity amount (e.g., number of steps walked or distance traveled) of the user. Also, additional digital content, such as a badge, a coupon, or points may be further provided to the user through other activities, which may not include daily life and exercise activities of the user. The other activities may include, without limitation, a social activity, such as making a friend, which may be measured by internet postings, such as a photo upload and/or an opinion, submission of comments activity about a posting of a friend, and playing a mini game.

Figure 2:
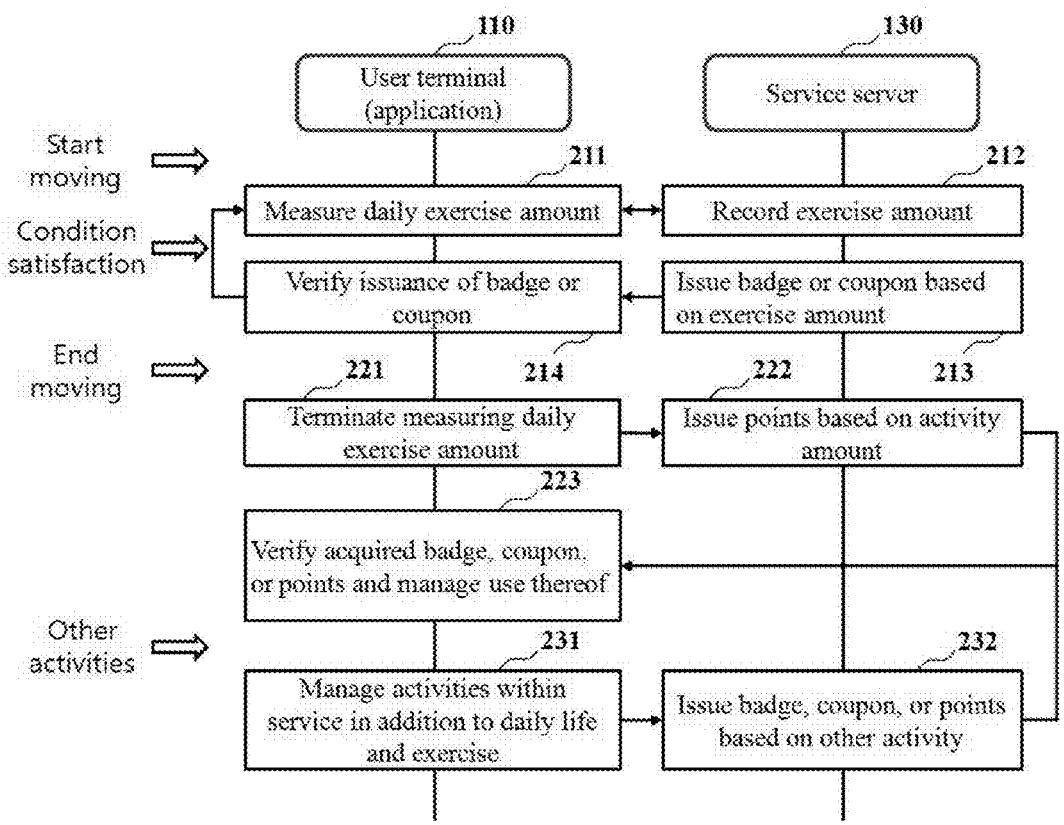
FIG. 2 is a flowchart illustrating a process of issuing digital content based on daily life in an activity of a user according to exemplary embodiments of the present invention.

FIG. 2 is a flowchart illustrating a process of issuing digital content based on daily life in an activity of a user according to exemplary embodiments of the present invention.

A user may identify or classify an activity as either a daily life activity or an exercise activity using a user interface of an application. More specifically, a user may select one of daily life activity and exercise activity options from the user interface to classify an activity of a user. As described above, daily life activity may indicate a daily activity, inclusive of exercise activities, of the user, which may be measured using, for example, a gravity sensor and an acceleration sensor.

The user may select daily life activity option from the user interface and then may start moving. In response thereto, the user terminal 110 and/or the service server 130 may perform at least the operations described below. The user terminal 110 may perform the following operations according to a control of an application. However, aspects are not limited to the following operations.

In operation 211, the user terminal 110 may measure a daily exercise amount. For example, a daily life activity may be measured using a pedometer function. The user terminal 110 may measure a number of steps that the user has taken or step count as an exercise amount. The number of steps may be measured using, for example, a gravity sensor and an acceleration sensor. The measured exercise amount may be transmitted to the service server 130.

In operation 212, the service server 130 may record the exercise amount.

The operation 211 and operation 212 may be repeatedly performed while the daily life activity remains selected. For example, the user terminal 110 may transfer the measured exercise amount to the service server 130 at predetermined intervals and the service server 130 may continuously record the received exercise amount.

Also, while recording the exercise amount, the service server 130 may verify whether the exercise amount of the user has satisfied a predetermined condition. The verification process may be performed substantially simultaneously when the exercise amount is recorded. When the predetermined condition is satisfied, operation 213 and operation 214 may be performed.

In operation 213, the service server 130 may issue a badge or a coupon based on the exercise amount. For example, when the predetermined condition specifies reaching 10,000 steps, and when an exercise amount corresponding to 10,000 steps is recorded, the service server 130 may issue a badge or a coupon to the user, the badge or coupon being predetermined digital content corresponding to the specified exercise amount. Further, the service server 130 may transmit, to the user terminal 110, a notification message about the issuance of the digital content.

In operation 214, the user terminal 110 may verify the issuance of the badge or the coupon. For example, in response to the notification message received from the service server 130, the user terminal 110 may inform the user that the badge or the coupon has been issued to the user.

Operation 211 may be performed again after operation 214 and thus, the user terminal 110 may continuously measure the daily exercise amount and the service server 130 may monitor the exercise amount of the user.

When the user stops moving, operations 221 through 231 may be performed. Cessation of the user's movement may automatically be detected at the user terminal 110. Further, the user may indicate termination of the daily exercise activity, which may be detected through a signal input received through the user terminal 110.

In operation 221, the user terminal 110 may terminate measuring the daily exercise amount. Further, the user terminal 110 may notify the service server 130 about the termination in measuring the daily exercise amount.

In operation 222, the service server 130 may issue points based on an activity amount. For example, the service server 130 may measure the overall activity amount according to the progression of the daily life activity, may calculate points corresponding to the measured activity amount, and may issue the calculated points to the user.

In operation 223, the user terminal 110 may verify that the badge, coupon, or points has/have been acquired, and may manage the use thereof. For example, the user terminal 110 may display information about the acquired badge, coupon, or points on a screen, so that the user may verify acquired digital content. Further, the user terminal 110 may provide a predetermined user interface so that the user may use the acquired digital content. For example, the user may convert the acquired digital content to digital currency at a store, and may purchase another digital content using the digital currency.

Also, as described above, the digital content may also be acquired through another activity, such as a social activity. Social activity, such as making a friend, which may include activities related posting, such as a photo and an opinion, posting a comment on a friend's profile/webpage, and/or playing a mini game. When the other activity is performed, operation 231 and operation 232 may be performed.

In operation 231, the user terminal 110 may manage one or more activities in addition to a daily life activity and an exercise activity. The user terminal 110 may provide a service so that the user may perform another activity according to a control of the application.

In operation 232, the service server 130 may issue a badge, a coupon, or points based on the other activity. After operation 232, the user terminal 110 may perform operation 223 again.

Figure 3:
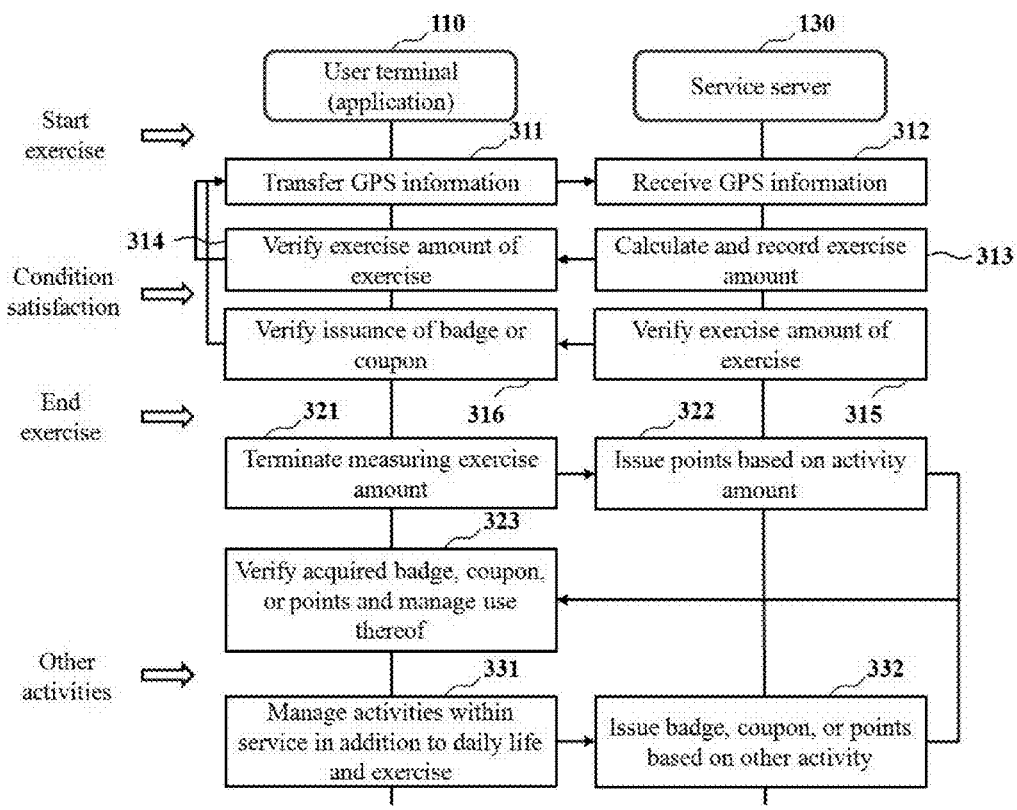
FIG. 3 is a flowchart illustrating a process of issuing digital content based on an exercise activity of a user according to exemplary embodiments of the present invention.

FIG. 3 is a flowchart illustrating a process of issuing digital content based on an exercise activity of a user according to exemplary embodiments of the present invention.

A user may identify or classify an activity as either a daily life activity or an exercise activity using a user interface of an application. More specifically, a user may select one of daily life activity and exercise activity options from the user interface to classify an activity of a user. As described above, exercise activity may indicate an activity of the user, which may be measured based on at least one of a location of the user terminal, a moving path of the user terminal, and an exercise amount of the user. The exercise amount may be measured based on a predetermined type of exercise selected by the user, for example, stepping, walking, running, cycling, and climbing.

The user may select a type of exercise and then may start selected exercise. In response thereto, the user terminal 110 and the service server 130 may perform the following operations. The user terminal 110 may perform the following operations according to a control of an application.

In operation 311, the user terminal 110 may transmit GPS information to the server 130. For example, the user terminal 110 may create location information and may transmit the location information to the service server 130.

In operation 312, the service server 130 may receive the GPS information. For example, the service server 130 may receive and manage location information transmitted from the user terminal 110.

In operation 313, the service server 130 may calculate and record an exercise amount. The exercise amount may be calculated based on a change in location information of the user terminal 110 according to a type of exercise.

In operation 314, the user terminal 110 may verify the exercise amount of the user detected by the user terminal 110. For example, the service server 130 may transfer the calculated exercise amount to the user terminal 110, and the user terminal 110 may verify the transferred exercise amount and display the verified exercise amount on a screen.

Operation 311 through operation 314 may be repeatedly performed while the exercise continues. Accordingly, the service server 130 may monitor a location of the user, an exercise amount, or a moving path.

When a predetermined condition is satisfied, the service server 130 may perform the following operations.

In operation 315, the service server 130 may issue a badge or a coupon based on the location or the exercise amount of the user.

In operation 316, the user terminal 110 may verify the issuance of the badge or the coupon.

Here, operation 311 may be performed again and exercise activity data, such as the location and the exercise amount, may be continuously measured.

When the user ends exercise, operation 321 through operation 323 may be performed. Termination of the exercise by the user may be automatically detected by the user terminal 110. Further, the user may indicate the termination of the exercise by inputting a signal on the user terminal 110.

In operation 321, the user terminal 110 may terminate measuring the exercise amount. Further, the user terminal 110 may notify the service server 130 about the termination in measuring the exercise amount.

In operation 322, the service server 130 may issue points based on an activity amount. For example, the service server 130 may measure the overall activity amount according to a progress of the exercise activity. For example, an activity amount according to a movement of the user detected by the user terminal 110 and an activity amount according to an exercise amount of the user detected by the user terminal 110, may calculate points corresponding to the measured activity amount, and may issue the calculated points to the user.

In operation 323, the user terminal 110 may verify receipt of the acquired badge, coupon, or points, and may manage the use thereof. For example, the user terminal 110 may display information about the acquired badge, coupon, or points on a screen, so that the user may verify receipt of the acquired digital content, and may provide a predetermined user interface so that the user may use the acquired digital content. For example, the user may convert the acquired digital content to digital currency at a virtual store, and may purchase another digital content using the digital currency.

Also, as described above, the digital content may also be acquired through another activity, which may not involve active physical movements by the user. The other activity or non-physical activity may include a social activity, such as, making a friend, activity related to posting on a website, such as a photo and an opinion, a comment activity about a posting of a friend, and playing a mini game. When the other activity is performed, operation 331 and operation 332 may be performed.

In operation 331, the user terminal 110 may manage other activities, which may be provided in the service offered through the application in addition to the daily life activity and exercise activity. Further, the user terminal 110 may provide a service so that the user may perform another activity according to a control of the application.

In operation 332, the service server 130 may issue a badge, a coupon, or points based on the other activity or the non-physical activity. After operation 332, the user terminal 110 may perform operation 323 again.

Figure 4:
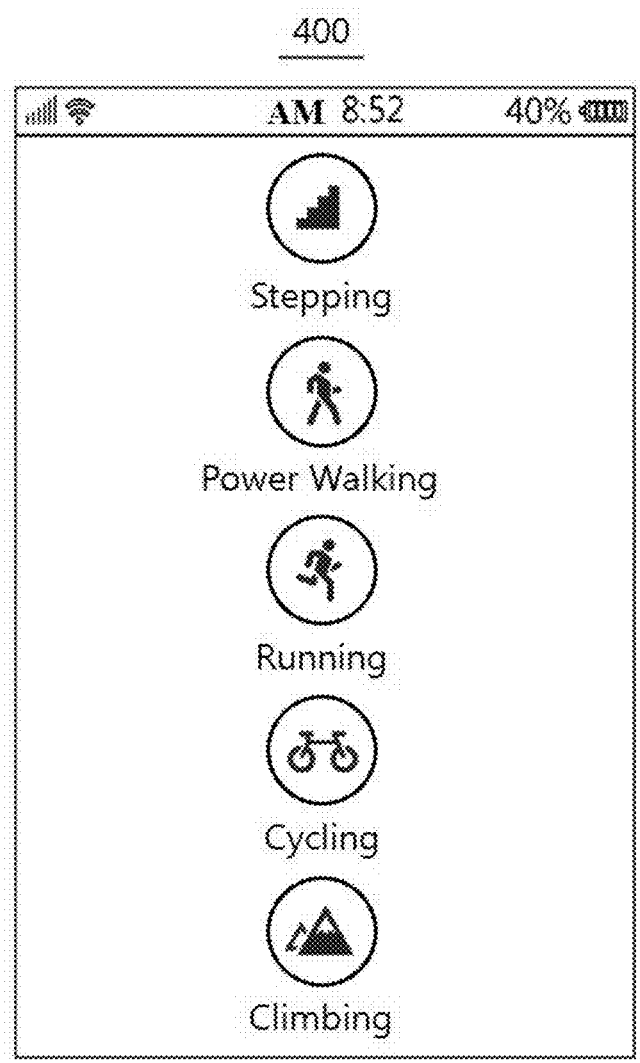
FIG. 4 illustrates a user interface for selecting a type of exercise according to exemplary embodiments of the present invention.

FIG. 4 illustrates a user interface for selecting a type of exercise according to exemplary embodiments of the present invention.

Referring to FIG. 4, a user interface that may enable the user to select a type of exercise, for example, stepping, power walking, running, cycling, and climbing is displayed on the screen 400. In response to a selection of the user on a predetermined type of exercise using the user interface displayed on the screen 400, the process of FIG. 3 corresponding to the selected type of exercise may be performed.

According to aspects of the invention, when a user ends the selected exercise, rankings may be determined between various users based on an exercise amount for the selected exercise. Users may verify rankings for each detailed item. Also, the users may acquire additional digital content, for example, a badge, a coupon, and points, by challenging records established by other users that may have a higher ranking than the user. In addition, rankings may be determined for a mini game. Even with respect to the mini game, users may acquire additional digital content by challenging records established by higher ranking users.

Figure 5:
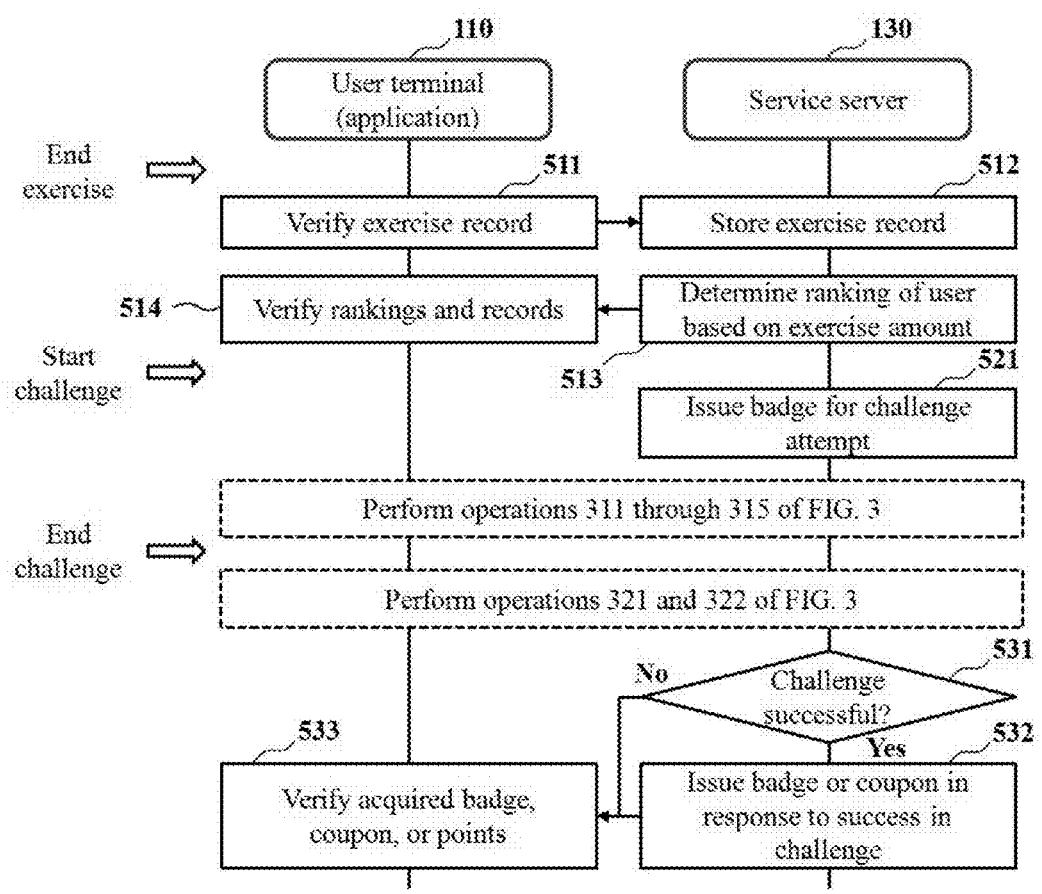
FIG. 5 is a flowchart illustrating a process of determining rankings of users and challenging a record established by users according to exemplary embodiments of the present invention.

FIG. 5 is a flowchart illustrating a process of determining rankings of users and challenging a record established by users according to exemplary embodiments of the present invention.

When a user ends an exercise activity, the following operations may be performed.

In operation 511, the user terminal 110 may verify or inspect an exercise record (e.g., a moving or traveled path) corresponding to the performed exercise activity. The exercise record may include a moving or traveled path of the user and an exercise amount. The moving path of the user may refer to a moving or travel path of the user terminal 110.

In operation 512, the service server 130 may store the exercise record.

In operation 513, the service server 130 may determine a ranking of the user based on the exercise amount. Rankings of users may be determined for each item or exercise, for example, overall rankings of users or rankings for each type of exercise. Rankings of users may be based, for example, calories burned, a moving speed, a moving time, a moving distance, and/or moving path. As described above, a type of exercise amount may include at least one of calories burned, a moving distance, a moving time, a moving speed, a moving path, and an altitude.

In operation 514, the user terminal 110 may verify rankings and records.

According to aspects of the invention, when the user challenges an exercise record established by a friend that ranks higher than the user, the following operations may be performed. The start of challenge may be recognized at the user terminal 110 in response to an input of the user through a user interface provided from the user terminal 110 according to a control of an application. Further, the start of the challenge may be informed to the service server 130.

In operation 521, the service server 130 may issue a badge for the challenge attempt. Operation 521 may relate to enhancing the user's interest in the challenge and thus, may be selectively performed. Accordingly, the operation 521 may be omitted in accordance with a configuration.

Also, when the user starts the exercise activity for the challenge attempt, operation 311 through operation 315 of FIG. 3 may be performed. When the user ends the challenge, for example, when the user ends the exercise activity, operation 321 and operation 322 of FIG. 3 may be performed.

In operation 531, the service server 130 may determine whether the user was successful in attempting the challenge. For example, when the user has passed the same path of the friend with a higher ranking with a faster time, or when the user moves a further distance than the friend with the higher ranking, the service server 130 may determine that the challenge of the user is successful. Information regarding whether the challenge is successful may be provided to the user through the user terminal 110.

In operation 532, the service server 130 may issue a digital content, such as a badge, coupon, or points, in response to the success in the challenge.

In operation 533, the user terminal 110 may verify receipt of the digital content.

According to exemplary embodiments, predetermined digital content, such as a badge or a coupon may be collected and edited through an item book. Also, the user may additionally acquire digital contents desired to be added through performing a challenge activity. For example, an exercise record or threshold may be set for a digital content to be awarded, and when the user achieves the established exercise record through the challenge activity, the corresponding digital content may be awarded to the user. In an example, when a predetermined digital content, such as a badge, is provided in response to completing the full B course of mountain A, the user may acquire the corresponding badge by challenging and completing the full B course of mountain A. Such badges may be produced and serviced in various forms, such as 10 km walking and completing a predetermined course.

Figure 6:
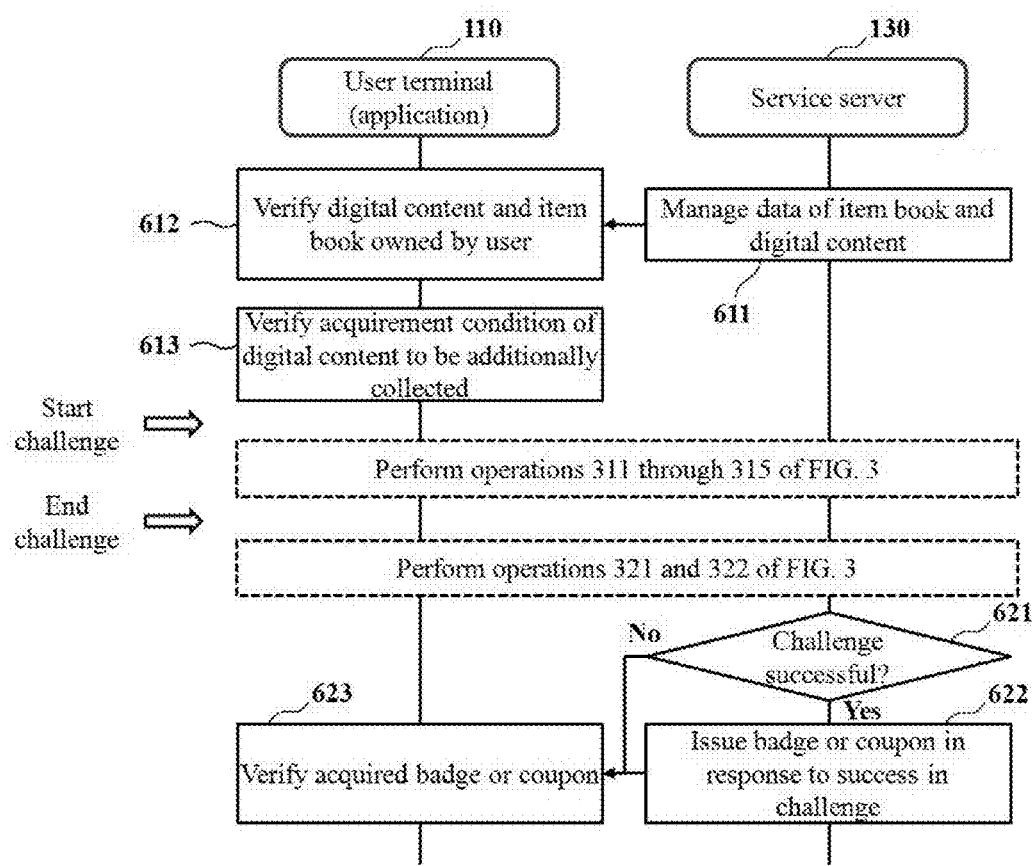
FIG. 6 is a flowchart illustrating a process of challenging and collecting a badge according to exemplary embodiments of the present invention.

FIG. 6 is a flowchart illustrating a process of challenging and collecting a badge according to exemplary embodiments of the present invention.

In operation 611, the service server 130 may manage data of an item book and digital content. Such data may be provided to the user terminal 110 in response to a request of the user terminal 110.

In operation 612, the user terminal 110 may verify receipt of the digital content and the item book owned by a user.

In operation 613, the user terminal 110 may verify or determine an acquirement condition of digital content to be additionally collected.

When the user selects digital content to be additionally collected and starts a challenge associated with the selected digital content, operation 311 through operation 315 of FIG. 3 may be performed. When the user ends challenge, for example, when the user ends the exercise activity associated with the challenge, operation 321 and operation 322 of FIG. 3 may be performed.

In operation 621, the service server 130 may determine whether the challenge activity has been successfully accomplished. For example, when the user achieves an exercise record corresponding to an acquirement condition of the challenge activity, the service server 130 may determine that the user has successfully completed the challenge activity. Information regarding whether the user has successfully completed the challenge activity may be provided to the user through the user terminal 110.

In operation 622, the service server 130 may issue a digital content, such as a badge, a coupon, or points, in response to the successful completion of the challenge activity.

In operation 623, the user terminal 110 may verify receipt of the acquired digital content.

According to exemplary embodiments, points of digital content may be converted to digital currency available at a virtual store associated with the service server 130. The digital currency may be referred to as energy or credit, and the digital currency may be acquired by converting the points, as described above, or may be purchased. According to aspects of the invention, the energy may not be converted to points. The user may purchase, at the virtual store with the acquired energy, for example, a badge, an item book, a giftcon capable of being inserted into the badge for editing the badge, and a mini game. Also, a predetermined badge may be sold. Further, points acquired by selling the predetermined badge may be converted to energy and thereby be used to purchase another digital content.

According to exemplary embodiments, a basic item book may be issued together with at the issuance of a badge. Badges present in an item book category may be automatically moved to a corresponding item book. The user may edit, for example, add, move, and delete, and thereby collect badges from the item book. Also, an additional badge and item book may be purchased at a virtual store with energy and thereby added. An item book that may allow configuration and editing by the user may be provided. When the user owns duplicate badges or a badge owned by the user becomes unnecessary or unwanted, the user may exchange the corresponding badge with another user or may exchange the corresponding badge with energy.

According to exemplary embodiments, digital content may further include a message item. The message item may include an item that allows the user to assign a message for a predetermined user at a predetermined location, section, area, or path. For example, a user A may assign a message "I love you" for a user C at a section B. In this example, when the user C passes the section B, the message "I love you" may be transmitted to a user terminal of the user C. Further, an advertiser may assign an advertisement message for some or all the users at a predetermined location. Also, a message may include digital content, for example, a badge, a coupon, and points. For example, an advertisement message and a coupon may be provided to a corresponding user. In the above example, the user A may provide, to the user C, the message "I love you" and predetermined points as gifts. More specifically, a message may be provided in a form of a phrase or phrase+reward. The reward may be provided in a form of digital content or a coupon that is downloaded from the user terminal and thereby immediately available. Also, a message item may be used when the user provides a message and a reward to the user himself or herself.

According to exemplary embodiments, the service method may reward an activity of a user based on a moving path of the user, for example, a map path of a corresponding section, a moving distance, and an exercise record, instead of using a predetermined location. For example, the service method may provide information, an advertisement, or an event by targeting users that pass a predetermined map path, for example, a bicycle road and a marathon course.

Also, friends or users may exercise together by setting a goal, such as a map path of a predetermined map or a certain distance, and by taking a challenge to achieve the set goal amongst the users or friends. Taking on a challenge between users may be induced by providing digital content, for example, a badge that may be acquired based on completing a predetermined map path, a moving distance, and/or exercise record, such as a time and a speed. For example, additional digital content, such as a badge, points, or a coupon, may be provided as reward for an activity of the user based on a moving path of the user, such as an amount of time used to pass a predetermined path or a distance used to pass the predetermined moving path.

Also, a ranking of the user may be determined based on an exercise record for each moving path of the user. The exercise record may be shared between users. A service to set challenges for the exercise record may be provided.

Figure 7:
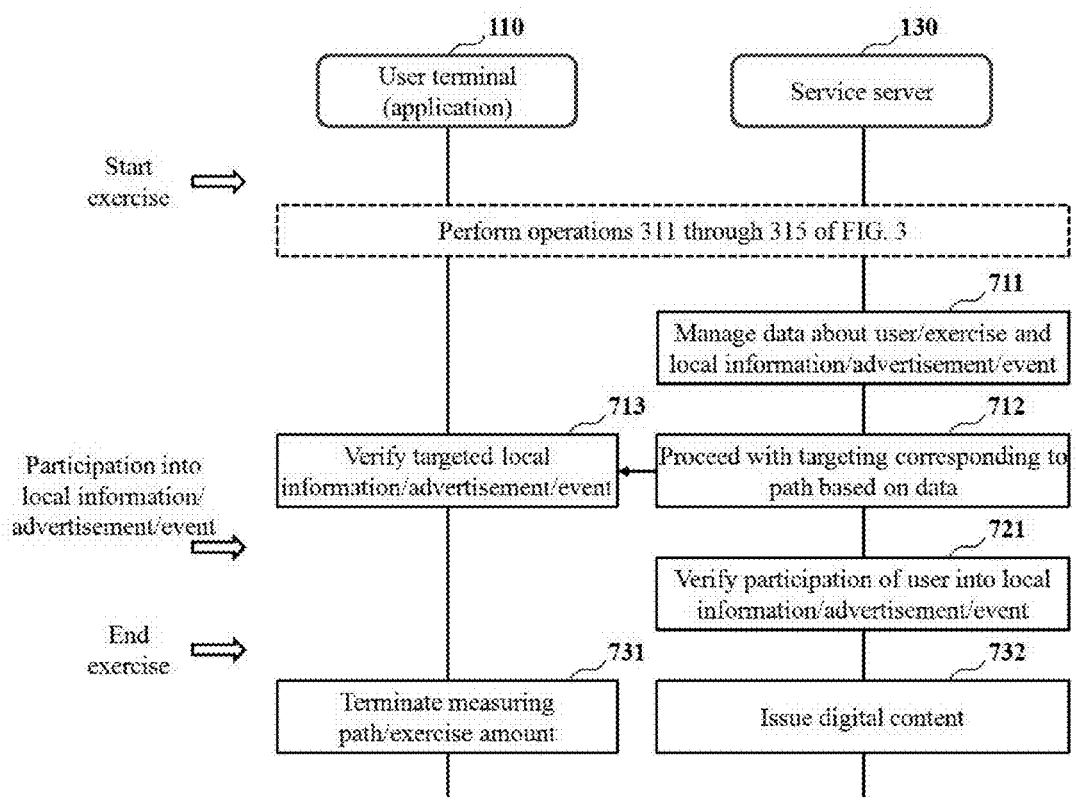
FIG. 7 is a flowchart illustrating a process of issuing digital content and providing target information based on a path according to exemplary embodiments of the present invention.

FIG. 7 is a flowchart illustrating a process of issuing digital content and providing target information based on a path according to exemplary embodiments of the present invention.

When a user starts the exercise activity, operation 311 through operation 315 of FIG. 3 may be performed.

In operation 711, the service server 130 may manage data about at least one of the user, the exercise, and target information, for example, local information, an advertisement, and an event. For example, the service server 130 may verify or determine a type of exercise activity that the user is performing, for each user. Further, the service server 130 may verify or determine a moving path and an exercise amount of the user through operation 311 through operation 315. Also, the service server 130 may verify or determine local information for a particular area or information about an advertisement or an event.

In operation 712, the service server 130 may proceed with targeting corresponding to a path based on the data. More specifically, the service server 130 may obtain or determine target location information, advertisement, event or the like based on the path, exercise activity and/or or corresponding data. For example, the service server 130 may determine a target user associated with local information, the advertisement, or the event, based on the type of exercise that the user is performing or based on a history of activities performed by the user. More specifically, the local information, the advertisement, or the event to be provided to the user may be determined based on one or more parameters, such as the type of exercise, the exercise amount, the moving path, and the like.

In operation 713, the user terminal 110 may verify or determine the targeted local information, advertisement, or event. For example, the user terminal 110 may receive, from the service server 130, the local information, advertisement, or event, and may display the same on a screen of the user terminal 110.

When the user participates in an activity corresponding to the provided local information, advertisement, or event, the following operation may be performed.

In operation 721, the service server 130 may verify or determine whether the user participates in the activity corresponding to the local information, advertisement, or event.

When the user ends exercise, the following operations may be performed.

In operation 731, the user terminal 110 may terminate measuring a path traveled by the user and/or an exercise amount. Further, the user terminal 110 may inform the service server 130 about the termination in the measurements of the path and/or the exercise amount.

In operation 732, the service server 130 may issue digital content. In addition to providing points according to an activity amount, the service server 130 may provide, to the user terminal 110, at least one of a digital content according to the path traveled by the user and predetermined digital content according to the user's participation in an activity corresponding to the local information, the advertisement, or the event. Further, the service server 130 may selectively provide points according to the activity amount.

As described above, the user may participate in a challenge or an event by wagering a badge. The challenge may be targeted at a predetermined map path and a distance path. A method of challenging a badge is described above with reference to FIG. 6. As described above, the challenge may include an exercise activity, for example, a marathon and a cycling game or event that requires participation of multiple users. The map path may indicate a predetermined path on a map, and the distance path may indicate a path that satisfies a predetermined distance.

According to exemplary embodiments, the service method may connect users based on not a predetermined location but a moving path of a user, and may induce relevant users to share information or to perform an activity with one another. The information to be shared may include, for example, user information, activity information, and purchase information. The activity to be performed may include, for example, a friend recommendation, a challenge, an event, and a mini game. For example, the service method may inform users passing a predetermined path A of a user that has passed or is currently passing the predetermined path A, and may induce the users to share information and/or perform an activity together.

To this end, the service server 130 may collect data about moving paths that overlap by at least a predetermined numerical value, may group and connect users of a corresponding moving path, and may induce users within the same group to share information and perform an activity together.

For example, the service server 130 may track moving paths of a user A and a user B that are passing a predetermined path. When the user A and the user B have moved at least N % of the predetermined path, the service server 130 may connect the user A and the user B to a single group and may provide group information to each of the user A and the user B. Although grouping and connecting two users is described above, aspects of the invention are not limited thereto, such that at least three users having moved at least N % of a predetermined path may be grouped and/or connected.

In an example, a user included in a group may verify or determine information about at least one of a badge, a ranking, a challenge, and a game of another user within the group, and may take an action, such as adding the other user as a friend, inviting the other user to a mini game, challenging a record established by the other user, or recommending or sharing a challenge to or with the other user. The service server 130 may transfer a request for a corresponding action to a user terminal of the other user. In response thereto, the other user may take a response action, such as verifying or accepting a friend invitation, accepting a challenge recommendation, or accepting an invitation to the mini game. The service server 130 may perform a process, such as a friend addition, beginning a mini game, or a challenge sharing, by connecting the user and the other user in response to the response action.

According to exemplary embodiments, the service method may arouse interest of a user by issuing a digital content, for example, a position of interest (POI) badge based on a predetermined location and/or path along a moving path during an activity of the user. The issuance of the digital content may induce the user to expand activity coverage of the user. For example, the service server 130 may calculate a location of the user using a Geo-Hash algorithm. The Geo-Hash algorithm may refer to a latitude/longitude Geo-code system. The service server 130 may calculate the location of the user using rectangles defined as a 5-digit character string (error range ±2.4 km) and a 7-digit character string (error range ±76 m) by the Geo-Hash algorithm.

Figure 8:
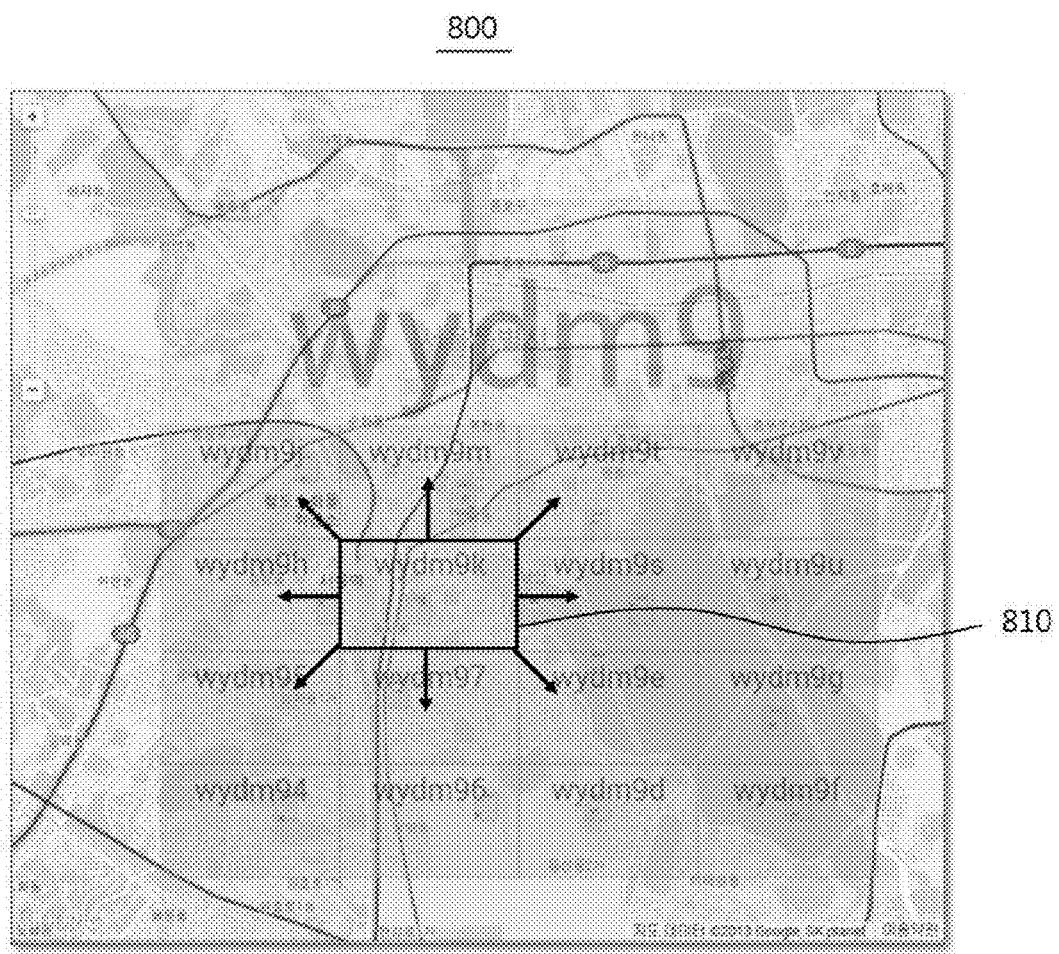
FIG. 8 illustrates a change in a location of a user using a Geo-Hash algorithm according to exemplary embodiments of the present invention.

FIG. 8 illustrates a change in a location of a user using a Geo-Hash algorithm according to exemplary embodiments of the present invention.

Referring to FIG. 8, a single rectangle defined as a 5-digit character string "wydm9" and rectangles defined as a 6-digit character string are displayed on a map screen 800. The rectangles defined by 6-digit character strings may be included within the boundary of the single rectangle defined by 5-digit character string. When a rectangle 810, which may be defined by 6-digit character string, is assumed as a rectangle corresponding to GPS information of the user, a subsequent moving location of the user may have 8 bearings as indicated by arrow indicators on the map screen 800. Although rectangles having a string of certain number of characters are described above, aspects of the invention are not limited thereto, such that the different shapes and number of character strings may be used. Further, according to aspects of the invention, moving direction or location of the user may have less that or greater than 8 bearings as described above.

Location based digital content may be issued in real time. To this end, the service server 130 may calculate badges to be issued at a particular location, may store the calculated badges in the user terminal 110 through an application, and may issue and verify a corresponding badge immediately in response to a location movement of the user.

Figure 9:
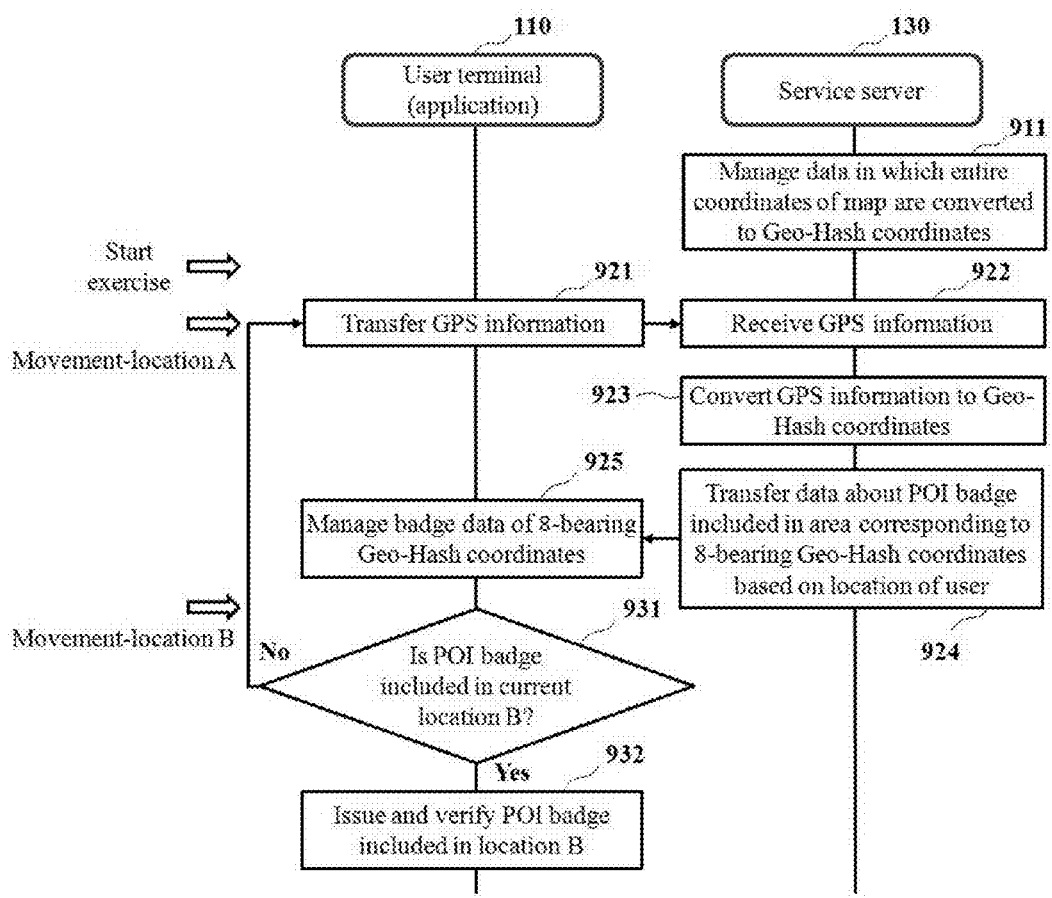
FIG. 9 is a flowchart illustrating a process of issuing a location based position of interest (POI) badge according to exemplary embodiments of the present invention.

FIG. 9 is a flowchart illustrating a process of issuing a location based POI badge according to exemplary embodiments of the present invention.

In operation 911, the service server 130 may manage data in which the entire coordinates of a map are converted to Geo-Hash coordinates.

When a user starts an exercise activity, the following operations may be performed.

In operation 921, the user terminal 110 may transfer GPS information. For example, the user terminal 110 may transmit the GPS information to the service server 130.

In operation 922, the service server 130 may receive the GPS information.

In operation 923, the service server 130 may convert the GPS information to Geo-Hash coordinates. For example, the service server 130 may convert the GPS information to the Geo-Hash coordinates based on the data managed in operation 911.

In operation 924, the service server 130 may transfer data about a POI badge included in an area corresponding to 8-bearing Geo-Hash coordinates, based on the location of the user. However, aspects of the invention are not limited thereto, such that other digital content may be issued based on POI. Further, the Geo-Hash coordinates may have less than or greater than 8-bearings. For example, as described above with reference to FIG. 8, movements of eight bearings may occur based on a single rectangle on the Geo-Hash coordinates. In response to the movements of eight bearings, the service server 130 may provide, to the user terminal 110 in advance, data about POI badges included in the corresponding area.

In operation 925, the user terminal 110 may manage data of a digital content (e.g., badge) that may be issued based on the 8-bearing Geo-Hash coordinates. As described above, location based digital content may be issued in real time and thus, the service server 130 may provide, to the user terminal 110 in advance, data about POI badges for an area corresponding to 8-bearing Geo-Hash coordinates, one of which may be the user's next location, before the user moves.

When the user is verified to have moved from a location A to a location B, the following operations may be performed.

In operation 931, the user terminal 110 may verify or determine whether a POI badge is included in a current location, for example, the location B. When the POI badge is included in the current location B, the user terminal 110 may perform operation 932. Conversely, when the POI badge is not included in the current location B, the user terminal 110 may track a movement of the user by returning to operation 921.

In operation 932, the user terminal 110 may issue and verify the POI badge included in the location B.

When the user ends the exercise activity, a measurement at the user terminal 110 may be terminated. Information about the badge acquired by the user terminal 110 may be transferred to the service server 130.

Also, for the path based digital content, data about a path and/or a badge may be stored in the service server 130. The path and an issuable badge may be checked and issued at a time by transferring a moving path to the service server 130 at the end of the user movement round.

Figure 10:
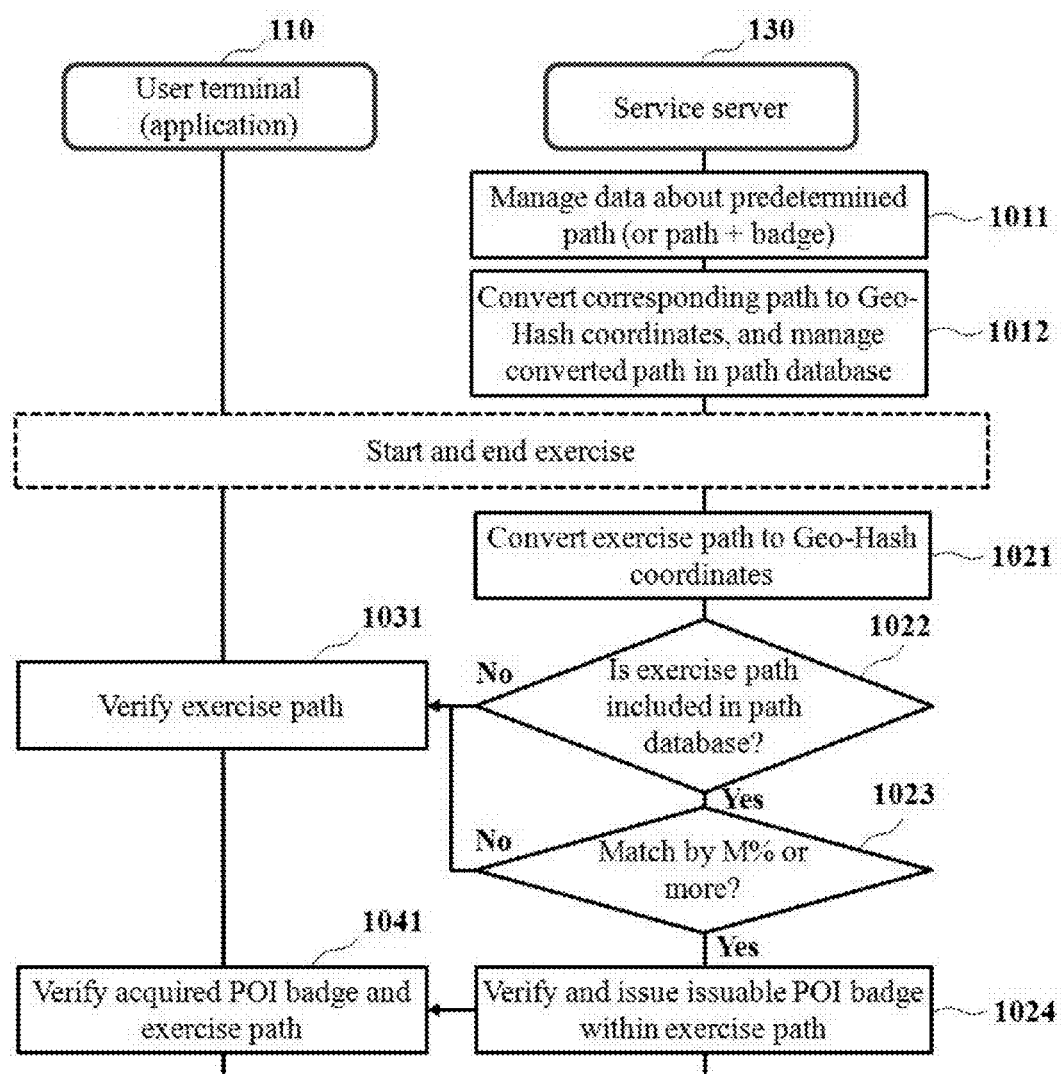
FIG. 10 is a flowchart illustrating a process of issuing a path based POI badge according to exemplary embodiments of the present invention.

FIG. 10 is a flowchart illustrating a process of issuing a path based POI badge according to exemplary embodiments of the present invention.

In operation 1011, the service server 130 may manage data about a predetermined path and/or a badge. More specifically, for a path in which digital content, such as a badge, may be present, data about the digital content and the path may be associated with each other and thereby managed.

In operation 1012, the service server 130 may convert the corresponding path to Geo-Hash coordinates, and thereby manage the converted path in a path database.

When the user starts and ends the exercise activity, the following operations may be performed.

In operation 1021, the service server 130 may convert an exercise path to Geo-Hash coordinates. For example, the service server 130 may convert coordinates of an exercise path to Geo-Hash coordinates with respect to exercise paths collected during the performance of the exercise activity, for example, a period of time from when the user starts the exercise activity until the user ends the exercise activity.

In operation 1022, the service server 130 may determine whether the exercise path is included in the path database. When the exercise path is included in the path database, the service server 130 may perform operation 1023.

In operation 1023, the service server 130 may determine whether a matching rate between the exercise path and a path included in the path database is M % or more. For example, when M=90, the service server 130 may verify whether a matching rate between the exercise path and the path included in the path database is 90% or more. Here, when the matching rate between the exercise path and the path included in the path database is 90% or more, the service server 130 may perform operation 1024.

In operation 1024, the service server 1030 may verify and issue an issuable POI badge within the exercise path.

In operation 1041, the user terminal 110 may verify the acquired POI badge and exercise path.

Conversely, when the exercise path is not included in the path database in operation 1022, or when the matching rate between the exercise path and the path included in the path database is less than M %, e.g., 90%, as determined in the operation 1023, operation 1031 may be performed.

In operation 1031, the user terminal 110 may verify the exercise path. For example, if an issuable POI badge is absent in the exercise path of the user, the user may verify the exercise path through the user terminal 110. Accordingly, the method of FIG. 10 may be terminated.

Although an exercise activity is described with respect to using a moving path, aspects of the invention are not limited thereto, such that the aforementioned description may be applicable when a movement occurs in a daily life activity.

Figure 11:
FIGS. 11 through 15 illustrate screens on which an exercise amount is displayed for a type of exercise according to exemplary embodiments of the present invention.
Figure 12:
Figure 13:
Figure 14:
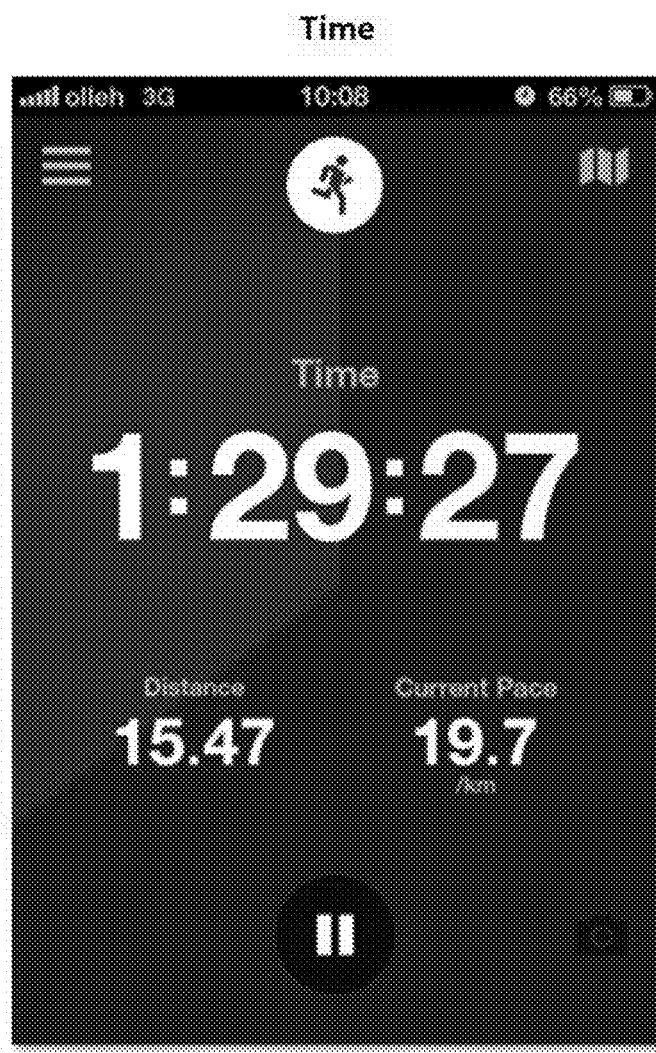
Figure 15:

FIGS. 11 through 15 illustrate screens on which an exercise amount is displayed for a type of exercise according to exemplary embodiments of the present invention. FIG. 11 illustrates a screen on which an amount of calories expended is displayed. FIG. 12 illustrates a screen on which a current speed, for example, a current pace is displayed. FIG. 13 illustrates a screen on which an altitude is displayed. FIG. 14 illustrates a screen on which a time is displayed. FIG. 15 illustrates a screen on which a distance is displayed.

Figure 16:
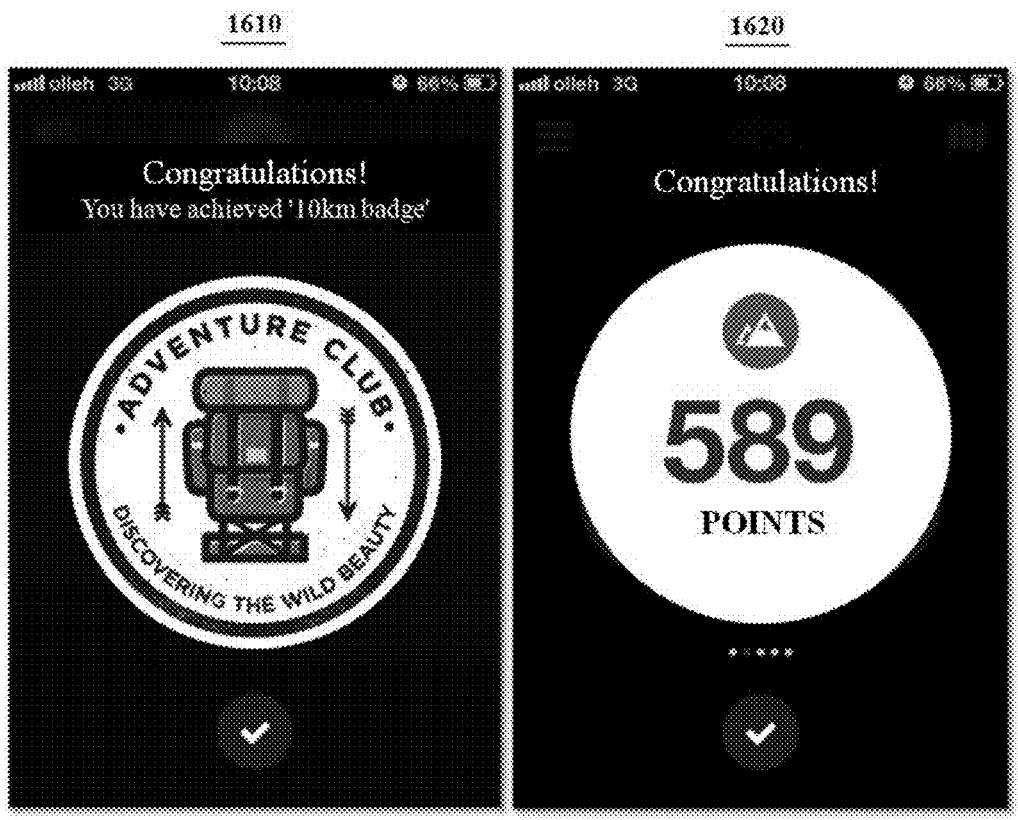
FIG. 16 illustrates a screen displaying acquiring a badge and points according to exemplary embodiments of the present invention.

FIG. 16 illustrates a screen for acquiring a badge and points according to exemplary embodiments of the present invention. An acquired badge is displayed on a first screen 1610, and an amount of points acquired is displayed on a second screen 1620.

Figure 17:
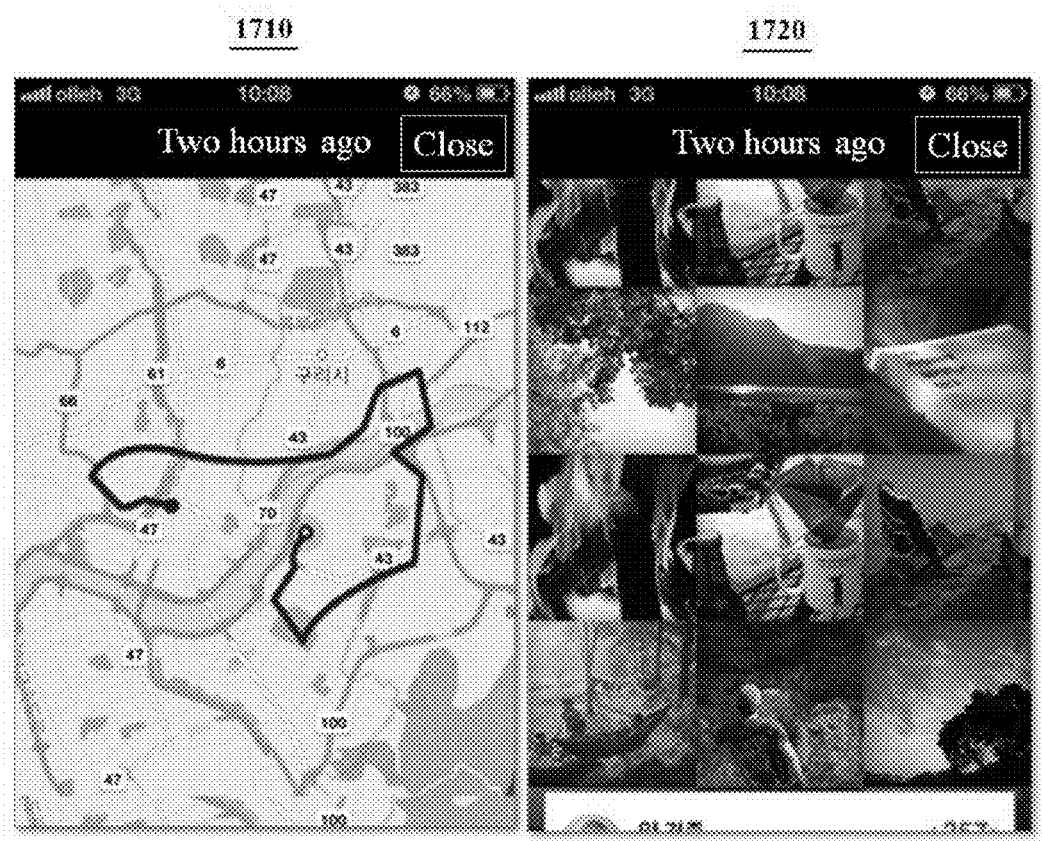
FIG. 17 illustrates a screen displaying sharing a record according to exemplary embodiments of the present invention.

FIG. 17 illustrates a screen for sharing a record according to exemplary embodiments of the present invention. A moving path of a user on a map, which may be shared, is displayed on a first screen 1710. Photos that may be captured while moving, which may be uploaded and/or shared, are displayed on a second screen 1720.

Figure 18:
FIG. 18 illustrates a screen on which a badge and an item book are displayed according to exemplary embodiments of the present invention.

FIG. 18 illustrates a screen on which a badge and an item book are displayed according to exemplary embodiments of the present invention. Various types of badges are displayed on a first screen 1810. Item books are displayed on a second screen 1820.

According to aspects of the invention, the service server may include at least one storage unit, for example a memory, and at least one processor, a receiver, a transmitter, and operations performed by the service server 130 may be processed according to a control of the at least one processor.

As described above, according to aspects of the invention, it may be possible to maintain and stimulate an activity of a user by measuring and recording an activity of the user including a moving path and an exercise amount as well as a location of the user, by determining a ranking of the user based on the activity of the user, and by issuing digital content as reward for the activity of the user.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media, such as CD ROM disks and DVDs; magneto-optical media, such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, aspects of the invention are not limited thereto. Instead, it would be appreciated by those skilled in the art that changes may be made to these exemplary embodiments without departing from the principles and spirit of the invention, the scope of which is defined by the claims and their equivalents.

What is claimed is:

1. A service method implemented using a computer, the method comprising:
   storing, in a memory of the computer, map coordinate data, the map coordinate data comprising coordinates of a map converted to Geo-Hash coordinates according to a Geo-Hash algorithm;
   receiving, using a receiver of the computer, location information of a terminal from the terminal;
   converting, using a processor of the computer, the location information according to the Geo-Hash coordinates; and
   transmitting, to the terminal using a transmitter of the computer, information about digital content allocated to a Geo-Hash area comprising adjacent Geo-Hash coordinates based on the converted location information,
   wherein the terminal is configured to determine the digital content to be transmitted to the terminal based on information about the digital content allocated to the Geo-Hash area and movement information of the terminal with respect to the Geo-Hash area.

2. The method of claim 1, wherein the Geo-Hash area comprises a map area corresponding to an area defined by a character string according to the Geo-Hash algorithm.

3. The method of claim 2, wherein the area defined by the character string has a rectangular shape.

4. The method of claim 2, wherein the character string comprises at least one of a 5-digit character string and a 7-digit character string among character strings provided from the Geo-Hash algorithm.

5. The method of claim 1, further comprising:
   receiving, from the terminal, information about the digital content when the digital content is transmitted to the terminal.

6. A non-transitory computer-readable medium storing a program to implement the method of claim 1.

7. A service method implemented using a computer, the method comprising:
   storing, in a memory of the computer, data about predetermined paths and digital contents allocated to the predetermined paths;
   converting, using a processor of the computer, each of the predetermined paths to Geo-Hash coordinates according to a Geo-Hash algorithm, and storing the converted Geo-Hash coordinates in a path database;

receiving, from a terminal, location information of the terminal, and measuring an exercise path based on the received location information;

converting the exercise path to Geo-Hash coordinates;

determining whether the exercise path corresponds to one of the predetermined paths included in the path database; and transmitting, to the terminal, digital content corresponding to the predetermined path when the exercise path and the predetermined path match by at least a predetermined numerical value.

8. The method of claim 7, wherein the determining comprises determining whether the exercise path corresponds to one of the predetermined paths in the path database by comparing character strings corresponding to the Geo-Hash coordinates.

9. A non-transitory computer-readable medium storing a program to implement the method of claim 7.

10. A service system, comprising:
at least one storage unit; and
at least one processor,
wherein the at least one processor is configured with executable instructions to perform processes comprising:
storing map coordinate data, the map coordinate data comprising coordinates of a map converted to Geo-Hash coordinates according to a Geo-Hash algorithm;
receiving location information from a terminal;
converting the location information according to the Geo-Hash coordinates; and
transmitting, to the terminal, information about digital content allocated to a Geo-Hash area comprising adjacent Geo-Hash coordinates based on the converted location information,
wherein the at least one processor is further configured to determine the digital content to be transmitted to the terminal based on information about the digital content allocated to the Geo-Hash area and movement information of the terminal with respect to the Geo-Hash area.

11. The service system of claim 10, wherein the Geo-Hash area comprises a map area corresponding to an area defined by a character string according to the Geo-Hash algorithm.

12. The service system of claim 11, wherein the area defined by the character string has a rectangular shape.

13. The service system of claim 10, wherein the at least one processor is further configured with executable instructions to:
receive, from the terminal, information about the digital content when the digital content is transmitted to the terminal.

14. A service system, comprising:
at least one storage unit; and
at least one processor,
wherein the at least one processor is configured with executable instructions to perform processes comprising:
storing data about predetermined paths and digital content allocated to the predetermined paths;
converting each of the predetermined paths to Geo-Hash coordinates according to a Geo-Hash algorithm, and storing the converted Geo-Hash coordinates in a path database;
receiving, from a terminal, location information of the terminal, and measuring an exercise path based on the received location information;
converting the exercise path to Geo-Hash coordinates;
determining whether the exercise path corresponds to one of the predetermined paths included in the path database; and
transmitting, to the terminal, digital content corresponding to the predetermined path when the exercise path and the predetermined path match by at least a predetermined numerical value.

15. The service system of claim 14, wherein during the process of determining whether the exercise path corresponds to one of the predetermined paths in the path database, the at least one processor is further configured with executable instructions to:
compare character strings corresponding to the Geo-Hash coordinates.

16. A file distribution system for distributing a file to install an application in a terminal, the file distribution system comprising:
a file storage configured to store the file; and
a file transmitter configured to transmit, to the terminal, the file in response to a request received from the terminal,
wherein the application comprises:
a module configured to control the terminal to transmit location information of the terminal to a service server;
a module configured to control the terminal to receive, from the service server, information about digital content allocated to a Geo-Hash area comprising adjacent Geo-Hash coordinates based on Geo-Hash coordinates corresponding to the location information;
a module configured to control the terminal to issue a digital content based on information about the digital content allocated to the Geo-Hash area and movement information of the terminal with respect to the Geo-Hash area; and
a module configured to control the terminal to transmit information about the issued digital content to the service server,
wherein the service server is configured to store map coordinate data, the map coordinate data comprising coordinates of a map converted to Geo-Hash coordinates according to a Geo-Hash algorithm, and to determine the digital content allocated to the Geo-Hash area.

17. A file distribution system for distributing a file to install an application in a terminal, the file distribution system comprising:
a file storage configured to store the file; and
a file transmitter configured to transmit the file to the terminal in response to a request received from the terminal,
wherein the application comprises:
a module configured to control the terminal to transmit location information of the terminal to a service server; and
a module configured to control the terminal to receive information about digital content corresponding to a predetermined path from the service server when an exercise path based on the location information of the terminal is determined to correspond to the predetermined path,
wherein the service server is configured to store data about predetermined paths and digital contents allocated to the predetermined paths, to convert each of the predetermined paths to Geo-Hash coordinates according to a Geo-Hash algorithm, to store the converted Geo-Hash coordinates in a path database, to convert the exercise path to Geo-Hash coordinates, to determine whether the exercise path corresponds to one of the predetermined paths included in the path database, and to transmit, to the terminal, digital content corresponding to the predetermined path when the exercise path and the predetermined path match by at least a predetermined numerical value.

* * * * *